United States Patent [19]

Haubs et al.

[11] Patent Number: 5,082,565
[45] Date of Patent: Jan. 21, 1992

[54] SEMIPERMEABLE MEMBRANE MADE FROM POLYETHER KETONES

[75] Inventors: Michael Haubs, Bad Kreuznach; Hansotto Drotloff, Frankfurt am Main; Juergen Wildhardt, Huenstetten-Wallrabënstein, all of Fed. Rep. of Germany

[73] Assignee: Hoechst Aktiengesellschaft, Frankfurt am Main, Fed. Rep. of Germany

[21] Appl. No.: 610,020

[22] Filed: Nov. 7, 1990

[30] Foreign Application Priority Data

Nov. 7, 1989 [DE] Fed. Rep. of Germany ....... 3936997

[51] Int. Cl.$^5$ ..................... B01D 61/00; B01D 39/00
[52] U.S. Cl. ..................... 210/650; 210/500.21; 210/500.27; 210/500.28; 55/16
[58] Field of Search ............ 210/500.27, 500.28, 210/500.29, 653, 652, 654, 500.21; 55/68, 16, 158; 521/27, 28; 524/108

[56] References Cited

U.S. PATENT DOCUMENTS

| | | | |
|---|---|---|---|
| 3,615,024 | 10/1971 | Michaels et al. | 210/490 |
| 4,108,837 | 8/1978 | Johnson et al. | 528/126 |
| 4,175,175 | 11/1979 | Johnston et al. | 528/125 |
| 4,229,291 | 10/1980 | Walch et al. | 210/23 F |
| 4,320,224 | 3/1982 | Rose et al. | 528 125/125 |
| 4,667,010 | 5/1987 | Eldin | 528/125 |
| 4,714,725 | 12/1987 | Hendy et al. | 524/108 |
| 4,720,343 | 1/1988 | Walch et al. | 210/500.28 |
| 4,804,472 | 2/1989 | Handlin, Jr. | 210/500.27 |
| 4,859,715 | 8/1989 | Dubrow et al. | 210/500.27 |
| 4,904,426 | 2/1990 | Lundgard et al. | 210/500.28 |
| 4,964,890 | 10/1990 | Reuter et al. | 55/158 |

FOREIGN PATENT DOCUMENTS

| | | |
|---|---|---|
| 3321860 | 12/1984 | Fed. Rep. of Germany . |
| 3731607 | 3/1989 | Fed. Rep. of Germany . |
| 388358 | 8/1990 | Fed. Rep. of Germany . |
| 1579310 | 8/1969 | France . |
| 1414421 | 11/1975 | United Kingdom . |

OTHER PUBLICATIONS

Rautenbach, R. and Albrecht, R., "Membrane Processes", John Wiley & Sons, New York, 1989, pp. 21-29.
W. Pusch et al., "Synthetic Membranes: State of the Art," Desalination, 35, 1980, pp. 5-20.
Robert E. Kesting, "Phase-Inversion Membranes," Synthetic Polymeric Membranes, 2nd Edition, 1985, pp. 237-286.

Primary Examiner—Robert A. Dawson
Assistant Examiner—Ana Fortuna
Attorney, Agent, or Firm—Foley & Lardner

[57] ABSTRACT

A semipermeable membrane of polyether ketones is disclosed. It contains a polymer possesssing the following recurring units:

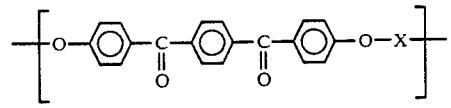

where x denotes

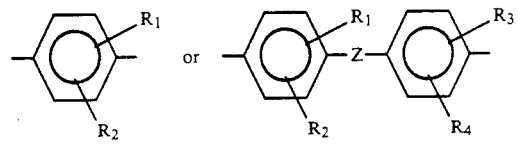

with
$R_1$, $R_2$, $R_3$ and $R_4$ being identical to or different from one another and denoting H, alkyl, aryl, oxyaryl, $NO_2$, CN, $NR_2$ or halogen, and
Z being one of the groupings —O—, —S—, —CH$_2$—, —CF$_2$—,

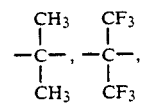

—SO$_2$— or —CO—

13 Claims, No Drawings

SEMIPERMEABLE MEMBRANE MADE FROM POLYETHER KETONES

BACKGROUND OF THE INVENTION

The present invention relates to a semipermeable membrane made from polyether ketones and to a process for its production.

Since the introduction of asymmetrical membranes from cellulose acetate (by Loeb and Sourirajan, see S. Sourirajan, *Reverse Osmosis*, Logos Press, London 1970) and from hydrophobic polymers (U.S. Pat. No. 3,615,024), numerous membranes have been developed and proposed, in particular for separating low- and macromolecular constituents dissolved in water. The structures and possible applications of these membranes have been described in the literature (*Desalination*, 35:5-20 (1980)), and the membranes have also been successfully employed for industrial or medical uses.

Many of the described membranes possess properties which render them particularly well suited for solving specific problems. Due to the differing chemical compositions and structural configurations of the individual membranes, the optimum suitability of each membrane is limited to very specific separation problems. This leads to the basic necessity of having to provide a new membrane for each new problem.

EP 082 433 gives a comprehensive survey on the advantages and disadvantages of known membranes. Hydrophilic asymmetrical membranes made of cellulose acetate exhibit, for example, satisfactory antiabsorptive properties, but possess inadequate thermal and chemical stability. Membranes made of polysulfones or similar polymers are distinguished by good thermal and chemical stability, but they are sensitive to the action of organic solvents.

Membranes made of cellulose reclaim material have both a hydrophilic character and resistance towards solvents; however, they are easily hydrolyzable in acid or alkaline media, and can be easily attacked by microorganisms.

DE 33 21 860 discloses membranes of partially-sulfonated polyether ketone which are chemically stable. These membranes are not dissolved as a result of the action of organic solvents, such as acetone or tetrahydrofuran (THF), but they swell considerably, which changes their membrane properties irreversibly.

SUMMARY OF THE INVENTION

It is therefore an object of the present invention to provide semipermeable membranes which are resistant to saponifying and oxidative agents and to heat, having properties which are unchanged even in organic solvents.

These and other objects according to the invention are accomplished by providing a membrane comprising a polyether ketone possessing recurring units of the following formula:

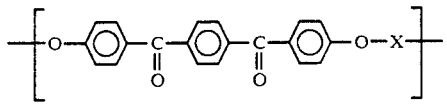

where X is

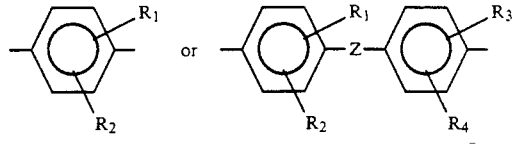

$R_1$, $R_2$, $R_3$ and $R_4$ are identical or different and are selected from the group consisting of H, $C_1$ to $C_4$ alkyl, aryl, oxyaryl, $NO_2$, CN, $NR_2$ or halogen, and Z is one of the groupings —O—, —S—, —CH$_2$—, —CF$_2$—,

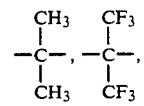

—SO$_2$— or —CO—

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The preparation of polyether ketones, for example, by nucleophilic aromatic polycondensation is known and described in EP 0 001 879 and GB 1 414 421. The above-described polyether ketones can be prepared in a known manner by allowing 1,4-bis(4-fluorobenzoyl)-benzene to act on alkali metal salts of bifunctional phenols, in dipolar aprotic solvents. The preparation is described, for example, in DE-A-37 31 607, the disclosure of which is hereby incorporated by reference. In the same way, copolymers can be prepared by allowing 1,4-bis(4-fluorobenzoyl)benzene to act on a mixture of alkali metal salts of bifunctional phenols. Random or block copolymers can be prepared in this manner according to the state of the art.

The molecular weight of the polyether ketones, indicated in terms of weight average, is generally in the range of about 2,000 to 500,000, preferably of about 5,000 to 100,000, and in particular in the range of 10,000 to 60,000.

The present invention is directed to a semipermeable membrane containing these polyether ketones as main constituents.

To prepare a membrane according to the invention from polyether ketone, the polymer is first dissolved, filtered and degassed. Examples of suitable solvents include $H_2SO_4$, $CF_3$—$SO_3H$, HF, $Cl_2HC$—COOH and, in particular, a mixture of $Cl_2HC$—COOH and $H_2SO_4$ in a weight ratio of about 4:1. From this solution, a semipermeable membrane is produced by known means, using the phase inversion process. This process is described in Robert E. Kesting, *Synthetic Polymeric Membranes*, 2nd edition, 1985, pp. 237 et seq., the disclosure of which is hereby incorporated by reference. In accordance with this process, the polymer solution is spread, as a liquid layer, onto a substrate which should be substantially planar. The planar substrate can, for example, be a glass plate or a metal drum.

Then, a precipitation liquid is allowed to act on the liquid layer. The precipitation liquid is miscible with the solvent of the solution, whereas the polymers dissolved in the polymer solution are insoluble in the precipitation liquid and are precipitated as a semipermeable membrane. The precipitation liquid may, for example, be water.

In performing the process, it is advantageous to allow the precipitation liquid to act on the precipitated membrane until substantially all of the solvent originally contained in the membrane has been replaced by the precipitation liquid. Thereafter, the resulting membrane is freed from precipitation liquid, for example, by directly drying the membrane in an air stream or by first treating the membrane with a plasticizer, such as glycerol, and then drying it.

To prepare membranes located on a substrate layer that is permeable to flowable media, the procedure described above is followed, except that the substrate used for forming the membrane layer is a non-woven material, for example, a synthetic material, or a paper web, and that the formed membrane layer is left on the substrate. It is, however, also possible first to prepare the membrane without a substrate and then to apply it to a permeable substrate.

Hollow filaments or capillaries can also be prepared from the polyether ketone solution in a known manner by spinning the polymer solution through an appropriately shaped annular die or hollow needle die into a coagulation liquid, as is known from the state of the art. In accordance with the state of the art, the process parameters can be selected such that either an external or an internal skin is formed or both an external and an internal skin are formed. The wall thickness of this type of hollow filament or capillary in general is in the range of 20 to 500 μm.

If the coagulated membrane is impregnated with glycerol, the glycerol content is preferably adjusted to about 5 to 60%, relative to the total weight of the membrane; the impregnated membrane is dried, for example, at a temperature of about 50° C.

The membrane according to this invention is also suited as a support membrane for permselective layers which are produced directly on or in the membrane. For example, thin layers of less than about 1 μm, comprising polymers with functional groups (e.g., silicones, cellulose ethers, fluoro copolymers) are spread on water, applied to the membrane surface from the water and fixed, for example, by reaction with a diisocyanate, in order to achieve improved permselectivity. Similarly, the membrane according to this invention is also suited as a support for reactive molecules, for example, for fixing enzymes or anticoagulation agents, such as heparin, in a manner known from the state of the art. Furthermore, the membrane is a suitable support for permselective layers which are, for example, applied from organic solvents. Such composite membranes are used in the field of gas separation or pervaporation.

The thickness of the membrane according to this invention is in the range of about 10 to 300 μm, particularly of about 20 to 120 μm, without substrate layer.

The invention is explained in greater detail by means of the following Examples, without, however, being limited to the described exemplary embodiments.

EXAMPLE 1

One hundred fifty grams (150 g) of a polyether ketone having the following structure

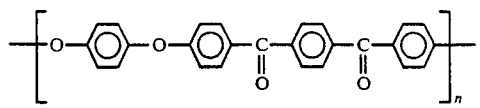

and an intrinsic viscosity of 1.0 dl/g (determined in 96% strength $H_2SO_4$ at 25° C.) were dissolved in 850 g of a mixture of dichloroacetic acid and $H_2SO_4$ (4:1, on a weight basis) at 30° C. with stirring. After about 10 hours, the solution was filtered and degassed.

A portion of the resulting solution was poured into $H_2O$, and the precipitated polymer was thoroughly washed with $H_2O$ and dried in vacuo at 100° C. over night. An analysis of this dissolved and reprecipitated polymer gave virtually the same data as an analysis of the starting polymer, as can be seen from Table 1 below.

TABLE 1

| | Tg (°C.) | Tm (°C.) | % Cl | % S |
|---|---|---|---|---|
| Starting polymer | 160 | 365 | 0.03 | 0.03 |
| Dissolved and reprecipitated polymer | 160 | 364 | 0.05 | 0.07 |

Tg: glass transition temperature of polymer
Tm: melting point of polymer
% Cl; % S: data of elemental analysis of polymer

EXAMPLE 2

As described in Example 1, polymer solutions were prepared, filtered and degassed. Using a casting device as described in U.S. Pat. No. 4,229,291, the resulting clear solutions of different concentrations (for details see Table 2) were applied onto a polypropylene non-woven substrate (FO 2430 ®, made by Freudenberg; 100 g/m²) and coagulated in water at 14° C. Thereafter, the membranes were soaked with a 40% strength aqueous glycerol solution and dried at 50° C. The dried, support-reinforced membranes had a thickness of 280 μm.

The membrane properties of the membranes produced in this way are compiled in Table 2 below.

The mechanical permeability (ultrafiltration) and the retention capacity towards dissolved macromolecules were determined at pressures of 3.0 bar and at 20° C. in a stirred cylindrical cell (700 rpm, 350 ml, membrane surface 43 cm²). The retention capacity R is defined as $$R = \frac{C_1 - C_2}{C_1} \cdot 100\%$$

$C_1$ being the concentration of the aqueous test solution, and $C_2$ being the concentration in the permeate.

The test solution was a 2% strength aqueous polyvinylpyrrolidone (PVP) solution, commercially available as Kollidon K30 ® from BASF, the molecular weight of the polyvinylpyrrolidone being 49,000 Dalton.

The concentrations were determined by means of a digital density measuring instrument (DMA 60+601 ®, available from Heraeus.

ample 2. The resulting membrane had the following properties:

H$_2$O flow at 3 bar: 128 l/m$^2$.h

TABLE 2

| Membrane No. | Polymer concentration g/100 g | H$_2$O flow 3 bar | Retention capacity (2% K30) | Solvent composition (H$_2$SO$_4$/Cl$_2$HC—COOH(w/w) |
|---|---|---|---|---|
| 1 | 10 | 620 | 65% | 20/80 |
| 2 | 12 | 480 | 70% | 20/80 |
| 3 | 14 | 340 | 87% | 25/75 |
| 4 | 16 | 180 | 91% | 25/75 |
| 5 | 12 | 160 | 95% | 100/0 |

EXAMPLE 3

Membrane No. 2 of Example 2 was soaked with water for 24 hours, then air-dried and used as a support for a silicone rubber film. For this purpose, the dry supporting membrane was provided with an approximately 80 μm thick coating comprised of a 2% strength silicone solution (9 parts by weight of VP 7660A plus 1 part by weight of VP 7660B, available from Wacker) in hexane, the solvent was removed by evaporation, and the resulting composite membrane was heated to about 70° C. in a drying oven for 16 hours. Then the gas flow rates were measured for several gases. The following values were obtained:

| Gas | N$_2$ | O$_2$ | CO$_2$ | He |
|---|---|---|---|---|
| Permeability, in cm$^3$ (STP)/cm$^2$·s·bar × 100 | 1.3 | 2.9 | 15 | 1.8 |

EXAMPLE 4

After a watering time of 24 hours, membrane 3 of Example 2 (see Table 2) was put in acetone for several hours so that the water present in the pores was almost completely replaced by acetone. Then the membrane was put in water again for a few hours. The data compiled in Table 3 below demonstrate that the properties of the membrane were practically unaffected as a result of the action of the organic solvent.

TABLE 3

| | H$_2$O flow (3 bar) | Retention capacity PVP, (2% K30) |
|---|---|---|
| Membrane prior to treatment with acetone | 340 | 87% |
| Membrane after treatment with acetone | 320 | 88% |

EXAMPLE 5

Fifty grams (50 g) of the polyether ketone having the following structure

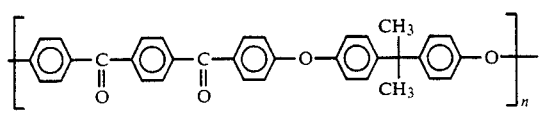

and an intrinsic viscosity of 0.6 dl/g were dissolved in 280 g of Cl$_2$HC—COOH at 25° C., filtered and degassed. From the 15% strength solution thus obtained, a membrane was produced at 14° C., as described in Ex- Retention capacity for 2% PVP K30: 97%

What is claimed is:

1. A process for producing a semipermeable membrane comprising a polyether ketone that possesses recurring units of the following formula:

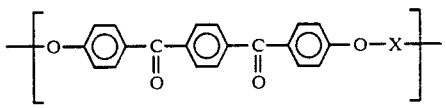

where X is

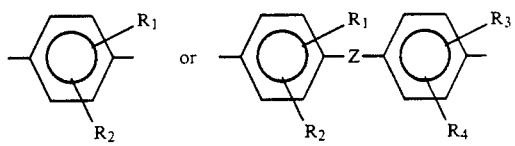

in which

R$_1$, R$_2$, R$_3$ and R$_4$ are identical or different and are selected from the group consisting of H, alkyl, aryl, oxyaryl, NO$_2$, CN, NR$_2$ or halogen, and Z is one of the groupings —O—, —S—, —CH$_2$—, —CF$_2$—,

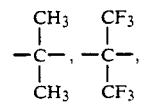

—SO$_2$— or —CO— the process comprising the steps of:

dissolving the polymer in a solvent;

filtering and degassing the polymer; and then producing a membrane employing the phase inversion process, wherein the solvent is selected from the group consisting of H$_2$SO$_4$, CF$_3$—SO$_3$H, HF, Cl$_2$HC—COOH and a mixture of Cl$_2$HC—COOH and H$_2$SO$_4$.

2. The process as claimed in claim 1, wherein the solvent is one of H$_2$SO$_4$ and a mixture of Cl$_2$HC—COOH and H$_2$SO$_4$, in a weight ratio of about 4:1.

3. The process as claimed in claim 1, wherein water is used as a precipitating agent in the phase inversion process.

4. A method of gas separation, comprising the steps of:

producing a membrane according to the process recited in claim 1; and separating a mixture of gases by passing them through the membrane.

5. A method of ultrafiltration, comprising the steps of:
  producing a membrane according to the process recited in claim 1; and
  ultrafiltering a mixture of liquids by passing them through the membrane.

6. The process as claimed in claim 1, wherein $R_1$ and $R_2$ are both hydrogen in the polyether ketone used to form the membrane.

7. The process as claimed in claim 1, wherein Z is one of a methylene group and a 2,2'-propylene group in the polyether ketone used to form the membrane.

8. The process as claimed in claim 1, wherein the polyether ketone used to form the membrane has a weight average molecular weight in the range of about 2,000 to 500,000.

9. The process as claimed in claim 1, wherein the solvent used is $CF_3-SO_3H$.

10. The process as claimed in claim 1, wherein the solvent used is HF.

11. The process as claimed in claim 1, wherein the solvent used is $Cl_2HC-COOH$.

12. The process as claimed in claim 1, wherein the solvent used is $H_2SO_4$.

13. A process for producing a semipermeable membrane consisting essentially of a polyether ketone that possesses recurring units of the following formula:

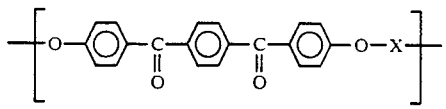

where X is

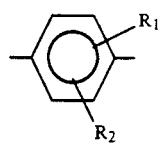 or 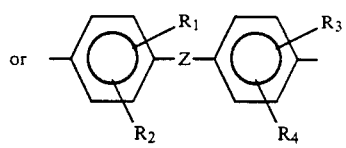

in which
  $R_1$, $R_2$, $R_3$ and $R_4$ are identical or different and are selected from the group consisting of H, alkyl, aryl, oxyaryl, $NO_2$, CN, $NR_2$ or halogen, and
  Z is one of the groupings $-O-$, $-S-$, $-CH_2-$, $-CF_2-$,

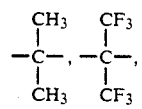

$-SO_2-$ or $-CO-$ the process consisting essentially of the steps of:
  dissolving the polymer in a solvent;
  filtering and degassing the polymer; and then
  producing a membrane employing the phase inversion process, wherein the solvent is selected from the group consisting of $H_2SO_4$, $CF_3-SO_3H$, HF, $Cl_2HC-COOH$ and a mixture of $Cl_2HC-COOH$ and $H_2SO_4$.

* * * * *